US007533053B2

(12) United States Patent
King et al.

(10) Patent No.: US 7,533,053 B2
(45) Date of Patent: May 12, 2009

(54) METHOD AND APPARATUS FOR ACCOMMODATING QUALITY REVIEW IN AN AUTOMATED ACCOUNT STATEMENT GENERATION PROCESS

(75) Inventors: Alana King, Champlin, MN (US); Steve Krueger, St. Louis Park, MN (US); Robert C. Simpson, Minneapolis, MN (US); Debra T. Corey, Andover, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 749 days.

(21) Appl. No.: 10/820,199

(22) Filed: Apr. 7, 2004

(65) Prior Publication Data

US 2005/0228727 A1    Oct. 13, 2005

(51) Int. Cl.
*G06F 17/60* (2006.01)
(52) U.S. Cl. .............................. 705/37; 705/35; 705/36; 705/64

(58) Field of Classification Search ................... 705/37, 705/35, 40, 1–50
See application file for complete search history.

(56) References Cited

U.S. PATENT DOCUMENTS

| 6,304,857 | B1 * | 10/2001 | Heindel et al. ................. 705/34 |
| 2002/0103756 | A1 * | 8/2002 | Andrews et al. ............... 705/42 |
| 2003/0233321 | A1 * | 12/2003 | Scolini et al. ................. 705/40 |
| 2005/0114193 | A1 * | 5/2005 | Kroening ........................ 705/8 |
| 2005/0228727 | A1 * | 10/2005 | King et al. ..................... 705/30 |

* cited by examiner

*Primary Examiner*—James P Trammell
*Assistant Examiner*—Marissa Liu
(74) *Attorney, Agent, or Firm*—Snell & Wilmer L.L.P.

(57) ABSTRACT

A computer-implemented quality review process is introduced in which account statements may be individually selected from a batch printing run. Selected statements may then be viewed, edited, approved and released for printing. Account statements may also be unapproved, unreleased, purged or regenerated after one or more reviews are conducted. The quality review process includes the generation of various reports regarding the batch run and any results of the quality reviews.

16 Claims, 8 Drawing Sheets

600 ↘

| STMT_ID | RPT_GRP_ID | RECIPIENT_ID | STMT_DESC | STMT_ACTV_CODE | STMT_FREQ_CODE | COPIES_NBR | QLTY_REVW_IND |
|---|---|---|---|---|---|---|---|
| 2222 | 32L | 26 | Alana/Test | Active | MEQ | 1 | 1 |

| CUR_DOC_NBR | CUR_PER_END | CUR_PER_CUT | BUS_OWNER_CODE | STMT_ID |
|---|---|---|---|---|
| 07312002000 | 7/31/2002 | 8/7/2002 | AMG | 1 |
| 07312002000 | 7/31/2002 | 8/7/2002 | AMG | 41 |

| RQST_ID | RQST_CODE | RQST_DOC_ID | RQST_DESC | RQST_PLCY_NAME | RQST_PLCY_ID | RQST_DOC_NAME |
|---|---|---|---|---|---|---|
| 126 | 3 | ModelDoc... | BobTest1 | Doc_num | 0731200200019 | 0731200200019 |
| 127 | 3 | ModelDoc... | Alana/Test | Doc_num | 0731200200019 | 0731200200020 |
| 136 | 4 | ModelDoc... | BobTest1 | Doc_num | 0731200200019 | 0731200200019 |

| RQST_ERROR_DESC | RQST_STAT_CODE | RQST_DATE | RQST_APR_IND |
|---|---|---|---|
|  | P |  | B |
|  | P |  | N |
|  | S |  | K |

| RQST_ID | RQST_CODE | RQST_DOC_ID | RQST_DESC | RQST_PLCY_NAME | RQST_PLCY_ID | RQST_DOC_NAME |
|---|---|---|---|---|---|---|
| 126 | 3 | ModelDoc... | BobTest1 | Doc_num | 0731200200019 | 0731200200019 |
| 127 | 3 | ModelDoc... | Alana/Test | Doc_num | 0731200200019 | 0731200200020 |
| 136 | 4 | ModelDoc... | BobTest1 | Doc_num | 0731200200019 | 0731200200019 |

| RQST_ERROR_DESC | RQST_STAT_CODE | RQST_DATE | RQST_APR_IND |
|---|---|---|---|
| Generation Error:4611 | E | 9/13/02 | B |
|  | C | 9/13/02 | N |
|  | S |  | K |

| RQST_ID | RQST_CODE | RQST_DOC_ID | RQST_DESC | RQST_PLCY_NAME | RQST_PLCY_ID | RQST_DOC_NAME |
|---|---|---|---|---|---|---|
| 126 | 3 | ModelDoc... | BobTest1 | Doc_num | 0731200200019 | 0731200200019 |
| 127 | 3 | ModelDoc... | Alana/Test | Doc_num | 0731200200019 | 0731200200020 |
| 136 | 4 | ModelDoc... | BobTest1 | Doc_num | 0731200200019 | 0731200200019 |

| RQST_ERROR_DESC | RQST_STAT_CODE | RQST_DATE | RQST_APR_IND |
|---|---|---|---|
| Generation Error:4611 | E | 9/13/02 | B |
|  | C | 9/13/02 | Y |
|  | S |  | K |

| RQST ID | RQST CODE | RQST_DOC_ID | RQST DESC | RQST PLCY NAME | RQST PLCY ID | RQST_DOC_NAME |
|---|---|---|---|---|---|---|
| 126 | 3 | ModelDoc... | BobTest1 | Doc_num | 0731200200019 | 0731200200019 |
| 127 | 3 | ModelDoc... | Alana/Test | Doc_num | 0731200200019 | 0731200200020 |
| 136 | 4 | ModelDoc... | BobTest1 | Doc_num | 0731200200019 | 0731200200019 |
| 137 | 6 | ModelDoc... | Alana/Test | Doc_num | 0731200200019 | 0731200200020 |

| RQST ERROR DESC | RQST STAT CODE | RQST DATE | RQST APR IND |
|---|---|---|---|
| Generation Error:4611 | E | 9/13/02 | B |
|  | C | 9/13/02 | Y |
|  | S |  | K |
|  | S | 9/13/02 | K |

FIG. 11

METHOD AND APPARATUS FOR ACCOMMODATING QUALITY REVIEW IN AN AUTOMATED ACCOUNT STATEMENT GENERATION PROCESS

FIELD OF THE INVENTION

This invention generally relates to data processing for financial functions, and in particular it relates to account statement preparation.

BACKGROUND OF THE INVENTION

Standard month-end account statement generation processes can take five or more days for a corporate accounting department to complete. Though such processes are now somewhat automated by certain accounting software programs, they remain manually intensive in various aspects. For example, prior systems generate and print statements as a batch printing job, whereby all account statements in the batch may only be printed together (in order to prevent duplicate billing or the loss of individual statements). After printing, the statements are manually reviewed for accuracy and appearance in a quality review process, after which the statements are distributed to the appropriate billed parties. If problems in any statements are discovered during quality review, the data for any such erroneous statements must be re-entered into the accounting system and the entire batch printing job must be run again. This can substantially increase the time it takes to disseminate account statements, thereby negatively impacting the amount of time it takes a company to collect billed amounts or to report account data to its clients.

In addition, in many large scale corporate departments, account statement generation programs must retrieve data from diverse computing systems or platforms that may be employed in various corporate departments. The collection of data across multiple platforms is prone to error and requires time-consuming cross-checking in order to properly confirm the accuracy of any account statements generated in that environment.

Accordingly, there is a need for a method and apparatus for accommodating quality review in an automated account statement generation process that addresses certain problems in existing technologies.

SUMMARY OF THE INVENTION

It is an object of the present disclosure, therefore, to introduce computer-implemented methods for reviewing and editing individual account statements, such as billing statements, credit card statements, and summaries of investment holdings, that are designated for batch printing. In particular, one method allows a user to select at least one individual account statement from a plurality of account statements designated for batch printing and provide one of: an approval of the selected account statement, a rejection of the selected account statement, a correction of the selected account statement, a request for regeneration of the selected account statement, and a request to purge the selected account statement. The method prevents batch printing of the plurality of account statements until each individual account statement is approved and released for printing.

According to further aspects of the present disclosure, when a correction is entered for an account statement that effects a change to a financial value, the changed financial value must be entered into a financial database from which the selected account statement was generated, and the corrected account statement is then regenerated and included for batch printing without regenerating the plurality of individual account statements.

According to still further aspects of the present disclosure, a user may enter an approval and a release of selected account statements, whereby the batch printing is enabled to proceed when there are no further individual account statements designated for quality review.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 6 is a screen display showing an exemplary account statement table in accordance with the process of FIG. 2;

FIG. 7 is a screen display showing an exemplary document tracking table in accordance with the process of FIG. 2;

FIG. 8 is a screen display showing an exemplary report request table in accordance with the process of FIG. 2;

FIG. 9 is a screen display showing an exemplary statement generation update to the report request table of FIG. 8;

FIG. 10 is a screen display showing an exemplary business user update to the report request table of FIG. 8; and FIG. 11 is screen display showing an exemplary batch print update to the report request table of FIG. 8.

DETAILED DESCRIPTION OF THE SPECIFIC EMBODIMENTS

The purpose of the quality review processes introduced herein is to allow the display of selected account statements for review and editing prior to batch printing and distribution. The performance of quality review prior to printing allows account statements to maintain a common look after editing and dispels of the need to reprint an entire batch printing run when one or more statements contains errors, both of which are common in prior batch account statement generation processes.

In general, the disclosed quality review processes are implemented in a software application that allows accounting personnel to review and edit statements after their generation and prior to printing, assembly and mailing. This ensures that any account statements sent to clients or customers have an attractive appearance and contain accurate data.

The quality review application allows individual statements to be sorted and viewed in a variety of ways, such as by account number, recipient, document number or run date. Statement status may displayed in different colors for ease of reference. Individual statements may also be locally printed when they are being viewed and/or edited.

The quality review application further allows for multiple levels of review and approval in order to meet particular business requirements. For example, account statements can be approved by personnel at one corporate level, and released to print by another as desired. Various print management functions are provided at each of these levels.

The quality review application also provides the ability to archive an electronic copy of a batch of account statements on a computer server, wherein statements may be indexed by run date, account number and recipient. Retaining archived copies of the statements in this manner allows for more flexible preparation of marketing material or the like than in prior systems, where only hard copies of account statement runs were maintained.

Account statements of differing layouts, such as specialized formats relating to one or more classes of billed parties or for other marketing purposes, can be readily managed and implemented with the quality review application.

Referring now to FIGS. 1-11, wherein similar components of the present disclosure are referenced in like manner, various embodiments of a method and apparatus for accommodating quality review in an automated account statement generation process will now be particularly described.

Figure 1:
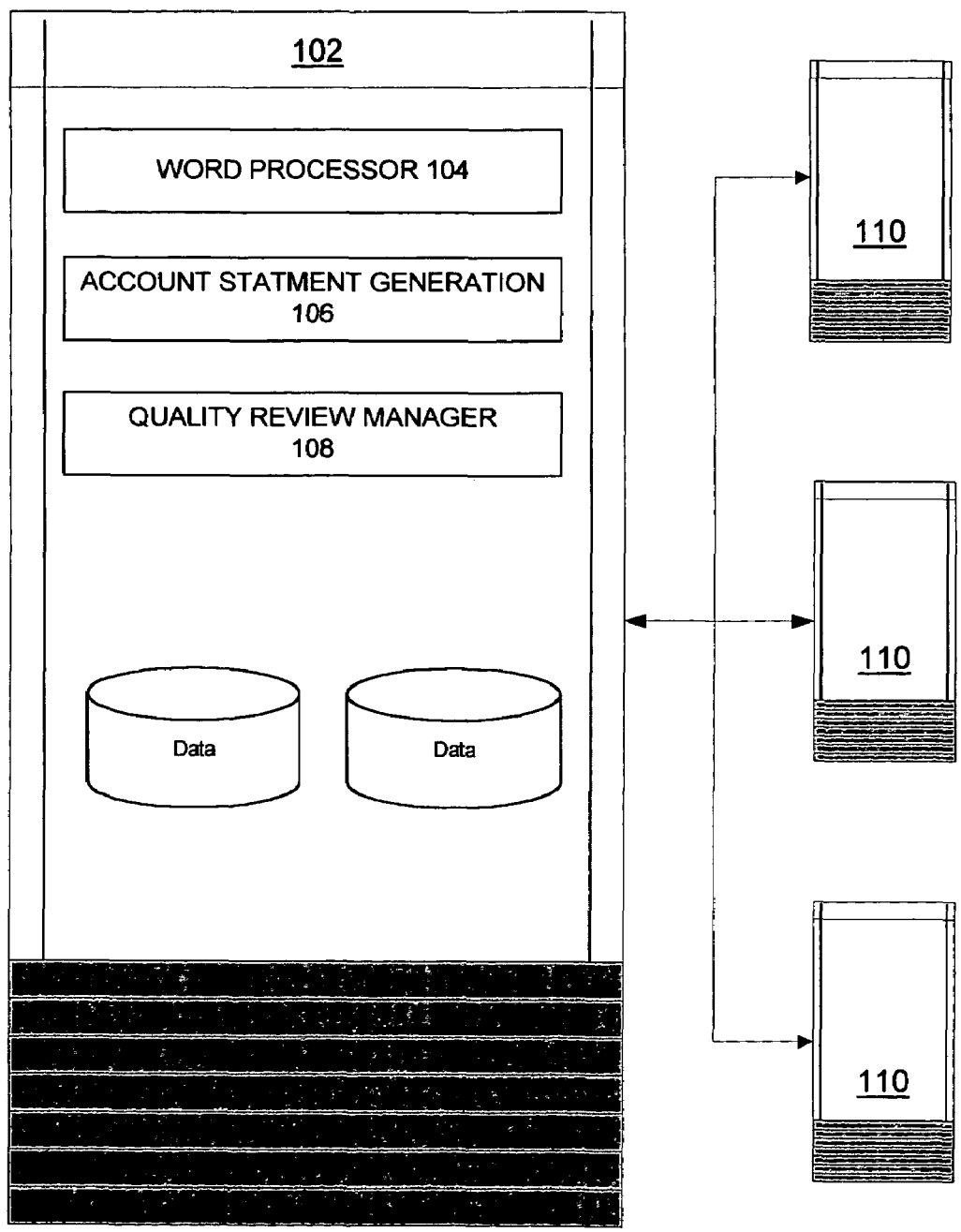
FIG. 1 is a block diagram of an exemplary computer network over which the processes of the present disclosure may be performed.

In FIG. 1 there is depicted an example of a network 100 over which the quality review processes of the present disclosure may be performed. It is readily contemplated that the network 100 may be any type of computer or telecommunications network over which financial transaction data and other electronic information may be communicated including, but not limited to, a local area network (LAN), a wide area network, a corporate intranet, a fiber optic network, a wireless network, the Internet, or any combination or interconnection of the same.

The network 100 may include a central accounting server 102, such as a network server of the type commonly manufactured by IBM CORPORATION. The central accounting server 102 may be any computing device that includes a processor for executing programmed processing instructions and a memory for storing such programs. The central accounting server 102, in the descriptions provided below, is described in the context of a MICROSOFT WINDOWS operating system, although any other operating system may be used to execute the processes disclosed herein.

In certain embodiments, the memory of the central accounting server 102 stores the following: (i) a document editing program 104, such as a word processor (e.g. MICROSOFT WORD), for managing and editing generated account statements; (ii) an account statement generation program 106; (iii) a quality review and print management program 108 as introduced herein; and (iv) one or more databases and database management programs (e.g. MICROSOFT SQL SERVER), including a financial database for maintaining the accounting records from which account statements are generated. The account statement generation program 106 and the quality review program 108 contain processing instructions provided in the format of a WINDOWS-compatible development language, such as VISUAL BASIC. The programs 106, 108 may be provided as separate software applications or may instead be integrated as separate modules of the same software application. The interactions of all of these programs and databases will be described in more detail later below.

The central accounting server 102 may be in communication with one or more printing devices (not shown) for enabling the printing of batches of account statements. The central accounting server 102 is also in communication with one or more remote user terminals 110, which may be operated by corporate accounting department personnel or the like to perform the quality review processes disclosed herein.

The remote terminals 110 may be any type of personal computing device, such as a WINDOWS-based personal computer (PC) of the type commonly manufactured by IBM CORPORATION. The remote terminals may locally store any of the programs described in conjunction with the central accounting server 102. Any of the remote terminals 110 may also be in communication with a local or network printer (not shown) for printing individual account statements. One or more of the remote terminals 110 may further be operative to backup or otherwise redundantly store database information from server 102.

Although a particular embodiment for the network 100 has been shown in FIG. 1, one of ordinary skill will readily recognize that numerous other configurations, interconnections, and hardware or software architectures for the network 100 and the components thereof are readily available.

Figure 2:
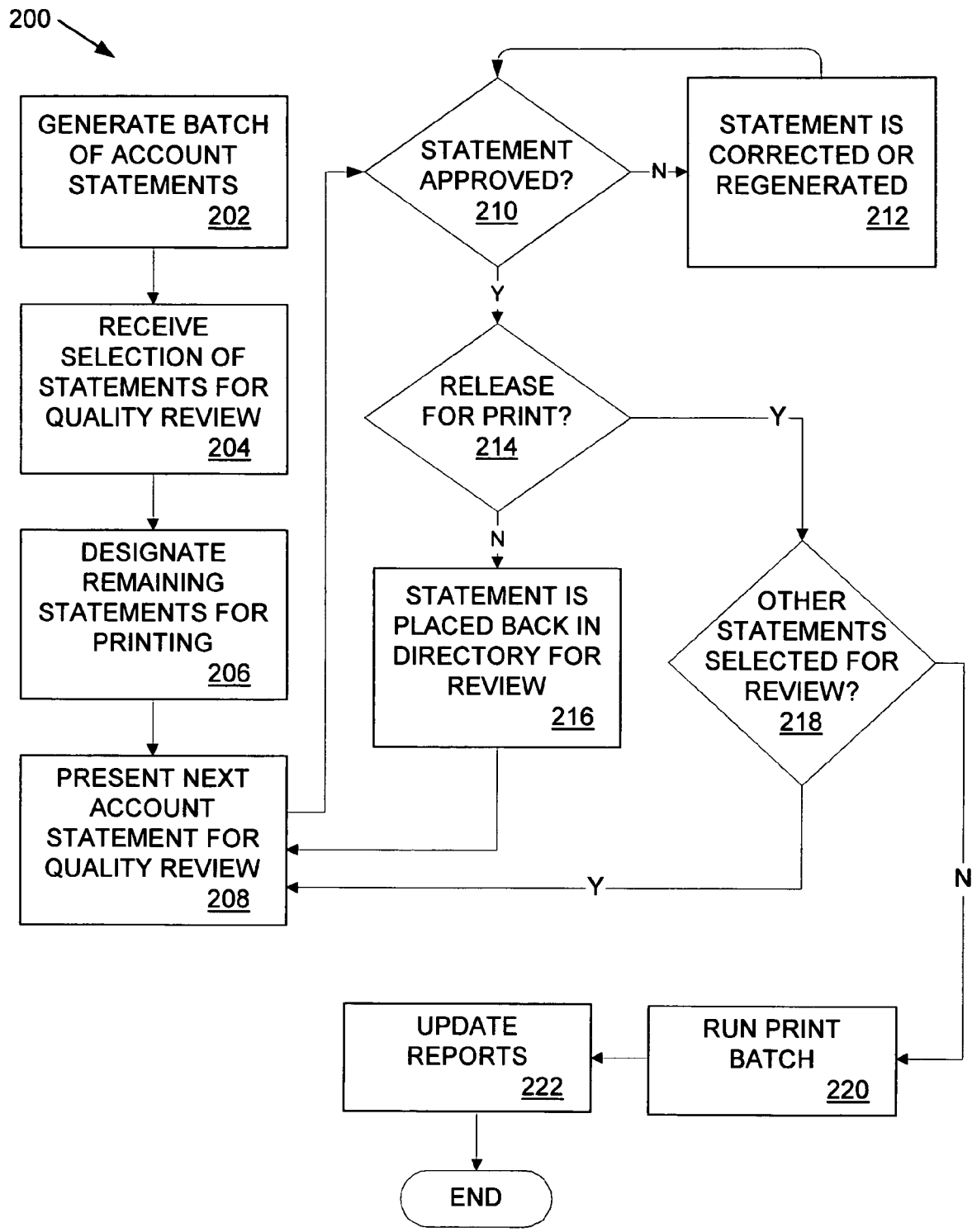
FIG. 2 is a flow chart of an exemplary process for performing quality review of account statements using the computer network of FIG. 1.

Turning now to FIG. 2, there is depicted an exemplary process 200 for performing quality review of account statements according to the present disclosure. The process 200 may be performed by the quality review management program 108 in response to commands entered by authorized corporate accounting personnel, and in cooperation with data provided by the account statement generation program 106. Such data includes account statement information that is to appear on the printed account statements as well as predefined layouts for the printed statements, both of which may be stored in a data format used by the word processor 104.

The process 200 commences with the entry of a command to generate a batch of account statements (step 202). Statement generation originates in the account statement generation program 106. One example of a useful account statement generation program 106, sometimes referred to herein as POWERWRITER, is described in detail in a co-pending U.S. patent application entitled "Automated Account Statement Generation Process" filed in the name of the inventors of the present application on a date concurrent herewith, and assigned to a common assignee, the entirety of which is incorporated herein by reference. Various other applications for generating account statement data may readily be used.

Data used to generate account statements are retrieved from financial and layout data stored by the central accounting server 102. Statements may be organized together for batch printing based on, for example, the accounting department responsible for the accounts corresponding to the account statements, and further grouped based on the date on which statements are assigned to be generated. Any other desired groupings based on available data may likewise be used.

Any account statement generation criteria is defined by an authorized user. Statements cannot be viewed or displayed in the quality review management program 108 until the statements are generated in step 202

The process 200 then continues with the quality review management program 108 receiving the statements selected for quality review from the POWERWRITER application (step 204). When statements are generated by the POWERWRITER application, authorized users are responsible for flagging a statement to be reviewed using the quality review management program 108. The statement may be designated for quality review by an appropriate indicator in stored with the data for generating the account statement. The indicator may be changed by an authorized user by selecting or unselecting a checkbox or the like provided within the POWERWRITER application. For any account statements in which errors are detected by the POWERWRITER application (for example, when required data for the account statement has not been entered), such erroneous statements may be automatically designated for quality review by the POWER-WRITER application. In addition, the default designation for each account statement may be to undergo quality review unless changed by an authorized user.

If an individual account statement has been assigned to print multiple copies within the POWERWRITER application, separate documents are generated and stored for each copy. The POWERWRITER application may assign a document number to each account statement for tracking purposes, and each statement having multiple copies may be assigned similar documents numbers.

Continuing from step 204 above, any statements that are not designated for quality review are automatically designated for direct printing in the batch run by the quality review application 108 (step 206). A listing of statements selected for quality review and a listing of statements selected for direct printing may then be displayed by the quality review management program 108 to a user on a display associated with the user's remote terminal 110.

Figure 3:
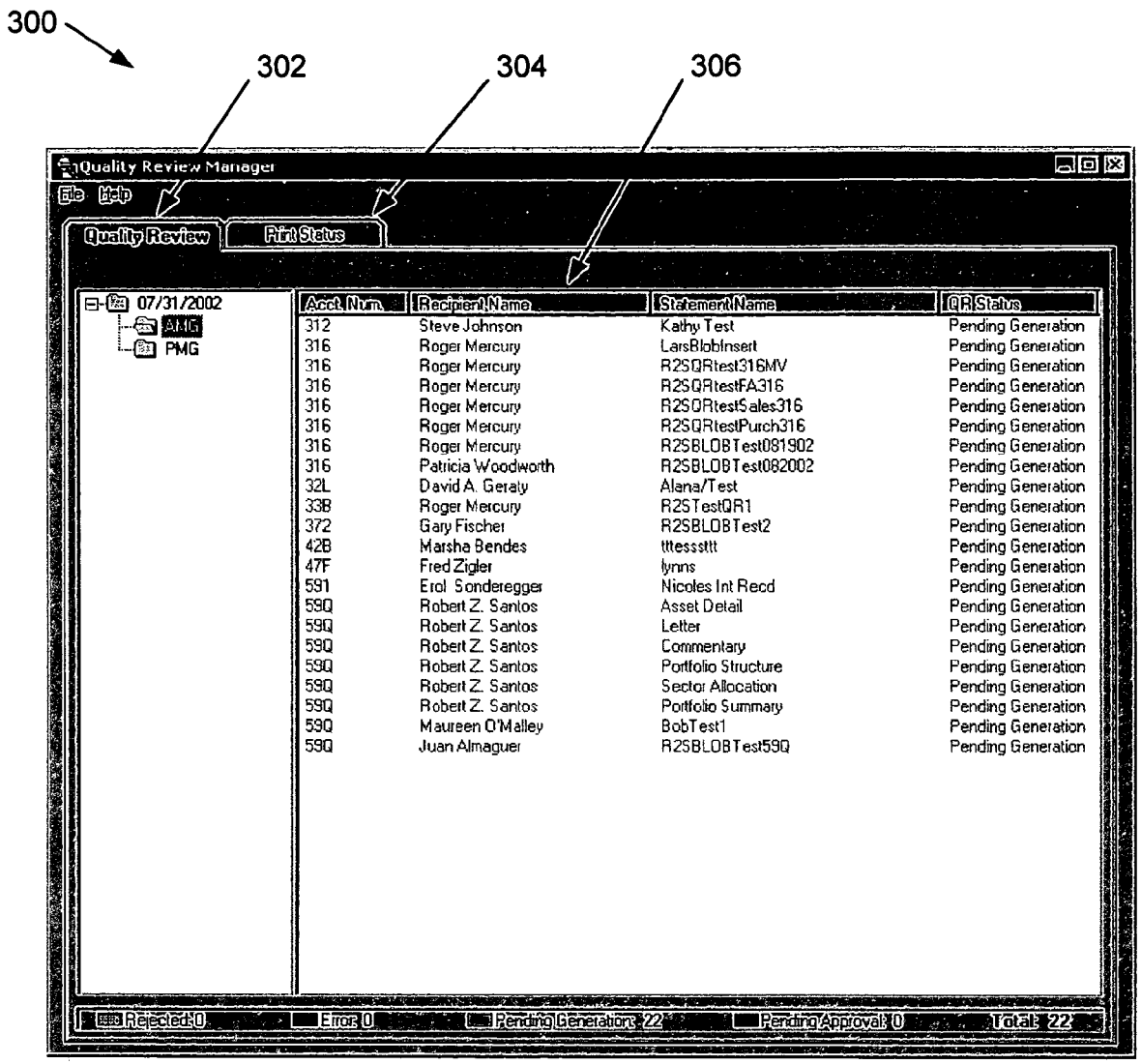
FIG. 3 is a screen display showing an exemplary quality review directory used with the process of FIG. 2.
Figure 4:
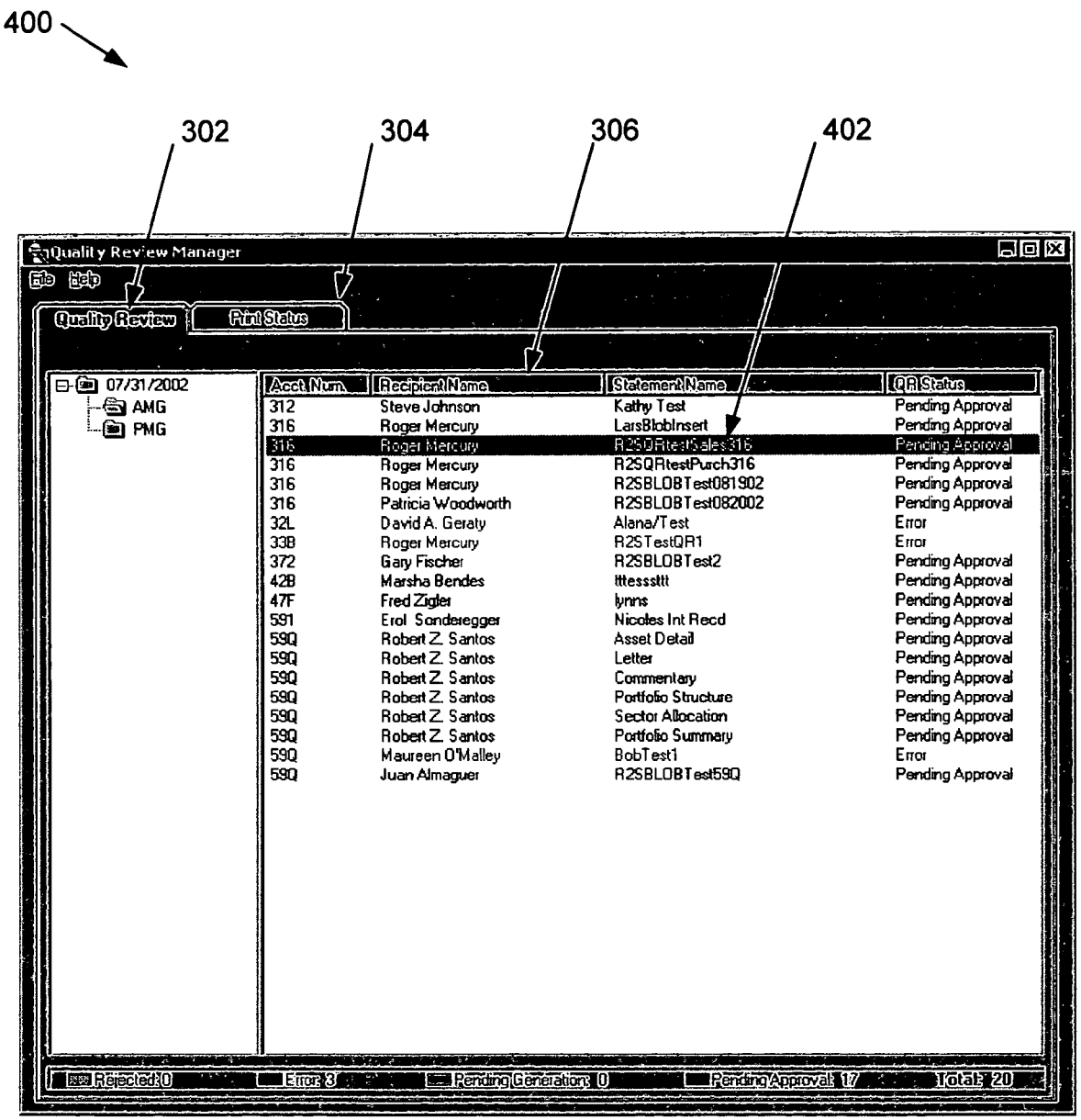
FIG. 4 is a screen display showing a sample account statement in accordance with the process of FIG. 2.

An exemplary window 300 showing the quality review management program 108 and the display of selected statements is presented in FIG. 3. As shown therein, there are two selectable tabs within the window 300: a quality review tab 302 and a print status tab 304. Statements that had been flagged for quality review are listed in a quality review directory 306 that is presented when the quality review tab 302 is selected by a user. Statements designated for direct printing are listed in a similar manner when the print status tab 304 is selected. That is, both listing may show an account number for which the statement was generated, a date of the statement, a name of the statement recipient, and an identification of the statement type. However, the listing in the quality review directory 306 may include a status of the quality review for the statement as shown in FIGS. 3 and 4, whereas the listing under the print status tab 304 may instead indicate whether the statement has been released for printing as shown FIG. 5.

Within the quality review directory 306, the quality review management program 108 displays a status of 'Pending Approval', 'Rejected' or 'Error' for each statement listed. Other status identifiers may likewise be used. The quality review management program 108 may color-code or otherwise highlight the listing of individual statements according to their status. For example, any statements having errors may be listed in red for enhanced visibility.

Continuing from step 206, an authorized user may then select an individual account statement to review (step 208). The user may select a statement by using a mouse, a keyboard, or other input device associated with a remote terminal 110. An example of a selected statement 402 is shown in the exemplary window 400 of FIG. 4.

A statement with a status of 'Pending Approval,' such as the selected statement 402, can be opened by clicking the highlighted statement using a mouse or by selecting a 'View' command via keyboard from a menu provided by the quality review management program 108. The user is then presented with a display of the generated statement itself, which can then be visually reviewed for accuracy and appearance.

From step 208, the user may then approve or edit the selected statement 402 (step 210). If the user is satisfied with the statement, the functionality to approve the statement is available on a menu provided by the quality review management program 108. Available commands may be selected via a drop-down box or the like in the window 300. The full complement of available functions provided under the quality review tab 302 are: (i) View Statement, (ii) Approve Statement, (iii) Reject Statement, (iv) Regenerate Statement, (v) Delete Statement, and (vi) Purge Entire Run. Statements may be approved one-by-one, or several at one time by highlighting multiple statements and selecting the Approve Statement function.

Once a statement is approved, it no longer displays on the quality review tab 302. It is instead displayed on the print status tab 304 with a status of 'Pending Release to Print'. This allows a subsequent review of the statement from the print status tab 304, if desired, prior to actually releasing the statement for batch printing. The subsequent review may be performed by the same user or a different user, such as corporate accounting personnel of higher rank.

If the selected statement is approved, the process 200 continues to step 214, described later below. Otherwise, the process 200 continues to step 212, wherein the statement is corrected and/or regenerated by the user. Statements with any status may be regenerated using the Regenerate Statement command provided within the quality review management program 108. Selecting this function returns the selected statement to a status of 'Pending Generation,' and POWER-WRITER must be run again to generate the statement. Unlike in prior systems, selecting an individual statement for regeneration does not require that all other statements designated for batch printing also be regenerated.

Any change made to the layout or financial data presented on a statement via the quality review management program 108 will not update the financial database from which the statement was generated. Therefore, if changes to any source data are required, such changes should be made directly to the financial database and any affected statements must be re-generated.

Any regenerated statement must be approved at step 210 before the statement is listed under the print status tab 304. Accordingly, after the statement is corrected or regenerated, the process 200 returns to step 210 above.

From step 210, and when a statement has been approved, the user may next release the statement for printing (step 214). As stated previously, statements that have been approved are removed from the quality review tab 302 and are instead displayed under the print status tab 304 with a status of 'Pending Release.' Statements that were designated to bypass quality review are also displayed on the print status tab 304, and may be automatically assigned the status of 'Released to Print' by the quality review management program 108. A listing of such statements is shown in the exemplary window 500 of FIG. 5. An example of a statement released for printing 502 is also shown.

As with statements listed under the quality review tab 302, statements designated for direct printing under the print status tab 304 may be viewed by selecting the statement using mouse or keyboard commands. Statements may be released for print one-by-one, or several at one time by selecting the statement(s) and entering a 'Release Statement for Print' command that is made available by the quality review management program 108 when the print status tab 304 is selected.

If the statement is released by the user, the process 200 continues to step 218, described further below. Otherwise the process 200 continues to step 216, wherein the statement is placed back in the quality review directory 306 for a subsequent quality review. From step 216, the user is then returned to step 208 where the same or another account statement in the batch may be selected for quality review.

At any time during the quality review process 200 and prior to printing the batch, a user may also perform various other functions provided by the quality review management program 108 that were not described in detail above.

If a statement is released for printing in error, or if any other reason is discovered that the statement should not be immediately printed, the statement can be 'unreleased' prior to the batch print function. An 'Unrelease Statement' command may be provided by the quality review management program 108 when the print status tab 304 is selected. Upon entry of an Un-Release Statement command by the user, the status of the affected statements will change from 'Released to Print' to 'Pending Release.'

Likewise, when a statement is approved in error, or if any other reason is discovered that the statement should not be printed, the statement can be 'unapproved' prior to the batch print function. An 'Unapprove Statement' command may be provided by the quality review management program 108 when the print status tab 304 is selected. A statement must have a status of 'Pending Release' to be unapproved. If the statement status is 'Released to Print,' the 'Unrelease Statement' command must be entered first.

Statements may be deleted entirely from the batch run using the 'Delete Statement' command, or the entire run may be purged using the 'Purge Entire Run' command described above. Statements will typically only be deleted if they are produced in error (i.e., a statement for a dead account was not set to an 'inactive' status prior to the run, or a statement was given an incorrect parameter). The entire batch run should only be purged in the event that statements were generated before critical data was available, and all statements must be regenerated to include the critical data. Once a statement is deleted or purged, it is no longer displayed in the quality review management program 108 and cannot be included in the current batch run. Deleted or purged statements are removed from both the quality review tab 302 and the print status tab 304.

A statement may be rejected using a 'Reject Statement' command provided by the quality review management program 108. such command is available under either the quality review tab 302 or the print status tab 304. The 'Reject Statement' command prevents the statement from being sent to the batch print queue, although the statement will continue to be displayed under the quality review tab 302. A statement that has been rejected can be regenerated, and if this is done, the statement will have a status of 'Pending Generation.' POWERWRITER must be run again to regenerate the rejected statement and the statement must then be approved prior to printing the batch.

The quality review management program 108 also provides a 'Print Local' command from either the quality review tab 302 or the print status tab 304. Entry of the 'Print Local' command will direct the quality review management program 108 to send the selected statement to a local printer in communication with the user's remote terminal 110. This allows the user to view any desired individual account statements on paper prior to the printing of the entire batch of statements.

Returning once more to the process 200, after a selected statement has been approved, the quality review management program 108 determines whether any other statements remain to be reviewed (step 218) If there are, the process 200 returns the user to step 208 above, where the user selects another statement for quality review. Otherwise, when there are no further statements to be reviewed, the process 200 continues to step 220 where the batch printing of the plurality of account statements is enabled and executed. The quality review management program 108 then generates and/or updates any reports that may be assigned to the batch printing run (step 222).

Report generation may be performed in response to a specific request from a user that can be entered by an appropriate command that is made available upon execution of the batch printing, or may be automatically generated by the quality review management program 108 when the batch printing is completed. Examples of reports include a number of statements in a printing batch that have been edited or otherwise required regeneration, a number of statements having errors after regeneration, a number of statements in the batch that successfully printed, or any other useful statistical information that is available for the batch printing run.

In order to maintain account statement data and generate the reports as described above, it is necessary to store and maintain various relational databases, examples of which will now be described. It should be readily apparent that the databases can be provided in a number of useful forms and that the examples herein below should not be viewed as the only manner in which such databases may be implemented.

An exemplary statement table 600 is shown in FIG. 6. The statement table 600 is operative to retrieve and update data for account statements in a batch printing queue such as the status of a statement and any parameters required for the printing of the statement. The Statement table 600 also stores an indication of whether the statement will be included on the quality review tab 302 or be displayed on the print status tab 304. The Statement Table 600, accordingly, may include the following fields:

A Statement Identification field (Stmt_ID) contains an identifier assigned by the POWERWRITER application upon statement generation, for uniquely identifying each account statement in the batch run. A Report Group Identification field (Rpt_Grp_ID) is used to store an indication of the group to which the statement belongs, and may include the account number for which the statement has been generated. A Recipient Identification field (Recipient_ID) stores the name of the recipient of the account statement and/or other contact information. A Statement Description field (Stmnt_Desc) contains a description of the statement assigned via the POWERWRITER application when a statement is created. Such description may not be shown on the resulting printed statement. A Statement Activity Code (Stmt_Actv_Code) field stores a status of the statement (i.e. active or inactive) based on whether the underlying account is active or inactive. A Statement Frequency Code (Stmt_Freq_Code) field stores the frequency for which account statements are generated for an account (i.e. monthly or quarterly) and may include a period end date by which the statement is to be printed and distributed. A Copies Number (Copies_Nbr) field is maintained to store the number of copies of the account statement that are to be printed in the batch printing run. Finally, a Quality Review Indicator (Qlty_Rvw_nd) field indicates whether the statement is designated for quality review or for direct print. For example, a value of '1' may be used to indicate that the statement will be displayed on the quality review tab 302, and a value of '0' indicates the statement will be displayed on the print status tab 304.

Turning now to FIG. 7, there is depicted a System Value Table 700 that is updated from POWERWRITER to track individual statements and certain values associated therewith. The System Value Table 700, accordingly, may include the following fields:

A Current Document Number (Cur_Doc_Num) field stores the document number assigned by POWERWRITER to each account statement. In certain embodiments, the document number is assigned sequentially with the first eight positions corresponding to the month, day and year of the ending date of the period billed in the statement, with the next four positions sequentially assigned to each account statement starting from a base number. The Current Period Ending Date and Current Period Cutoff Date (Cur_Per_End_Date, Cur_Per_Cutoff Date) fields contain the end date of the period covered by the account statement, and the date by which a statement must be printed and distributed dates, respectively. A Business Owner (Bus_Owner) field contains an indication of the accounting department which is responsible for the statement. Statements may be organized and generated in a single batch run by the POWERWRITER application based upon this code. Finally, a Statement Identification (Stmnt_ID) field is provided to maintain the same data as that described for the first field of the Statement Table 600. Records are deleted from the System Value table 700 either individually, if a single statement is deleted, or all at once where the entire run is purged by a user of the quality review management program 108.

In order to generate reports in the process 200 as described above, the quality review management program finally maintains a Report Request Table 800 as shown in FIG. 8. (Due to the length of this table 800, it is shown in FIG. 8 as split into two parts.) The table 800 may be updated by the quality review management program 108 as each statement is reviewed in one or more rounds of the process 200. The Report Request Table 800, accordingly, may include the following fields:

A Request Identification (Rqst_ID) field contains a sequential number assigned to each report request and is maintained for tracking purposes only. A Request Code (Rqst_Code) field stores an indication of whether the record is a generation record or a print record. It is used by the application to manage the records, physical documents, and the display of information to a user. The following exemplary values may be used for this field: '3'=Generation Record (i.e. statement is to be displayed on the quality review tab 302); '4'=Print Record (i.e., statement is to be displayed on print status tab 304) and '6'=Printed Record (indicates that a statement has been printed). An initial update to the table 800 will result only in values of 3 and/or 4 being stored in the Request Code field.

Figure 5:
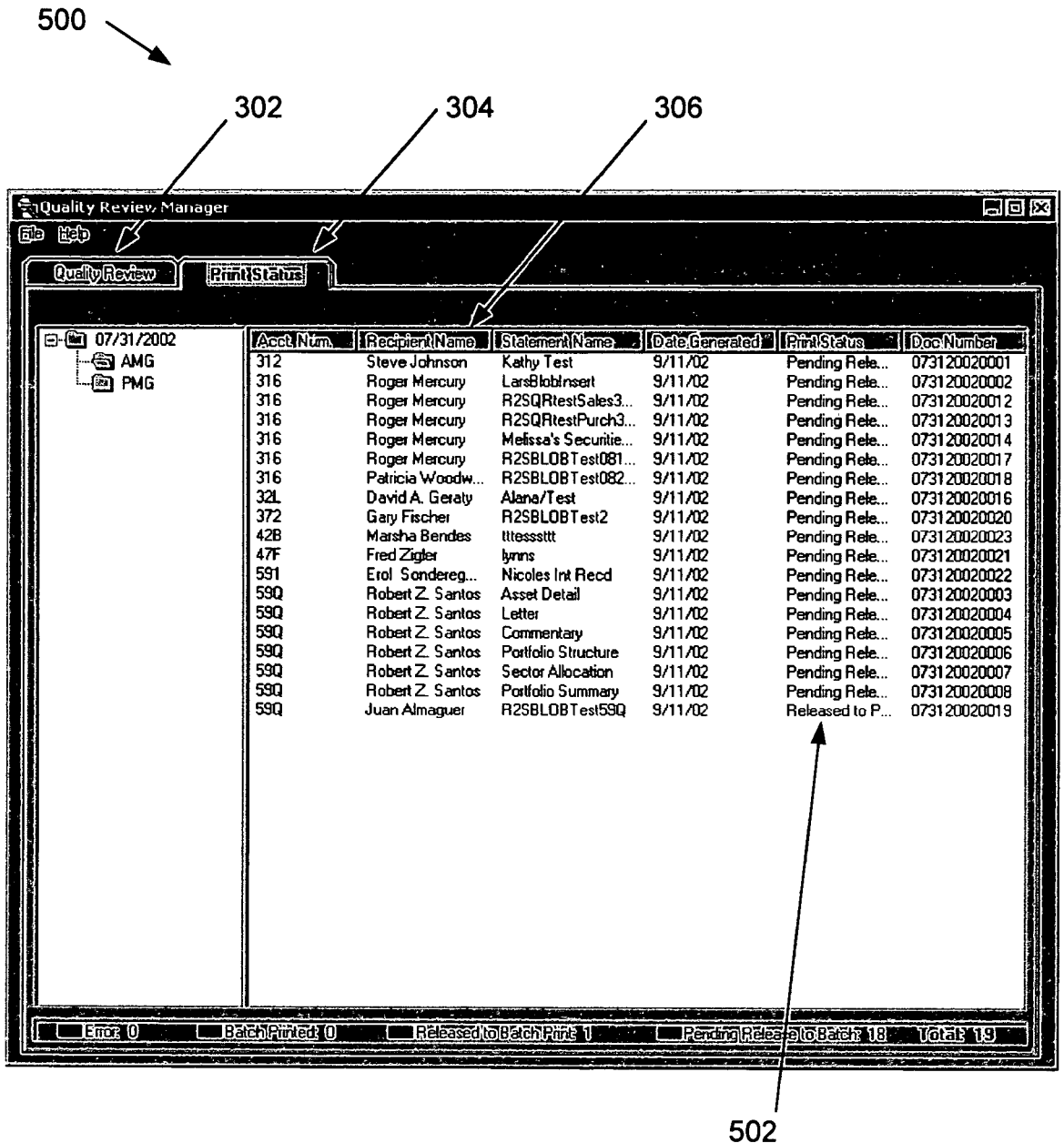
FIG. 5 is a screen display showing an exemplary listing of account statements released for printing in accordance with the process of FIG. 2.

A Request Document Identification (Rqst_Doc_ID) field maintains an identifier of the report to be generated. A Request Description (Rqst_Desc) field maintains the statement description entered in the Stmt_Desc field of the Statement Table 600. A request Policy Name (Rqst_Plcy_Name) field stores a constant document number value. A Request Policy Identification (Rqst_Plcy_ID) field maintains the same value as the current document number field stored in the System Value Table 700. The value from this field is displayed on the print status tab 304 of the quality review management program 108 in the 'Doc Number' field (as shown in FIG. 5) for tracking purposes. A Request Document Name (Rqst_Doc_Name) field maintains the same value as the Request Policy Identification field. A Request Error Description Code (Rqst_Error_Desc) field maintains a value that is updated after POWERWRITER is run to generate statements. Any statements that produce errors will have an error indicator 900 stored in this field, as shown in FIG. 9.

A Request Status Code (Rqst_Stat_Code) field maintains the current status of a statement during each update to the table 800, and is displayed in the quality review management program 108 in the 'QR Status' or 'Print Status' fields displayed with tabs 302 and 304, respectively (as shown in FIGS. 3 and 5). Exemplary values for this field include:
    'P'=Pending Generation
    'R'=Rejected
    'E'=Error 'C'=Generation complete (successful)
    'S'=Statement will be sent to single statement (local) print queue
    'M'=Statement will be sent to multiple statement print queue A Request Date (Rqst_Date) field stores the date on which the account statement was generated and is not set until POWERWRITER is run to generate the statements. Finally, a Request Approval Indicator (Rqst_Apr_Ind) field maintains a value indicative of whether or not a statement has been approved. Exemplary values for this field include:
    'N'=Not approved (statement will be displayed on the quality review tab 302)
    'Y'=Approved (statement is moved from quality review tab 302 to print status tab 304)
    'B'=Statement is set for batch printing
    'K'=record is to be kept for display in the quality review management program 108.

As described previously, a statement may go through one or more rounds of quality review before a group of account statements are all approved, after which the group is enabled for batch printing by the quality review management program 108. FIG. 9 is an example of a second update to the table 800 after an error is identified in one of the subject account statement by the program 108. In a further update to table 800, an indicator 1000 in the Request Approval Indicator field is changed to reflect that the statement corresponding to Request ID 127 has been approved by a user. The value of the Request Status Code field is also changed from an 'E' in FIG. 9 to a 'C' in FIG. 10 due to the entry of an approval of the subject statement. FIG. 11 shows a new statement listing 1100 that has been designated for quality review after a subsequent update.

Upon completion of the batch printing, the statements may be archived in electronic form in a word processing format or the like. The soft copy of the archived statements maybe indexed on the central accounting server 102 according to any the following data: batch run date; accounting department code; account number and recipient name. Other data may likewise be used to index the archived copies.

The quality review management program 108 and the quality review process 200 disclosed herein has reduced manual intervention and resulted in higher quality account statements. Using this system, data is more easily obtained from statements for marketing purposes and data accuracy is more readily validated, while the effort and expense associated with regenerating batch statements runs is reduced. Statements from various account types may be organized, reviewed and batch printed in the same group, which functionality was not possible in many prior systems. The professional presentation of statements resulting from the processes described herein will enhance a company's marketing potential and client retention.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for enabling a review of individual account statements assembled for batch printing, comprising:
    preventing the batch printing until the individual account statements are approved and released for printing;

retrieving an account statement from the individual account statements;

releasing the account statement when the account statement is associated with a flag indicating that the review is not required;

automatically detecting when the account statement is erroneous, wherein the erroneous account statement includes at least one of erroneous data and missing data and, wherein the erroneous account statement is added to an account statement cache;

presenting the account statement cache to a user by way of a graphical user interface, wherein the graphical user interface includes a quality review tab and a print status tab;

receiving, from the user, a selection of at least one of: the quality review tab and the print status tab;

displaying a first subset of the account statement cache within the quality review tab when the user selects the quality review tab, wherein the quality review tab displays at least one of: an account number, a statement date, a statement generation date, a recipient name, and a statement type indicator corresponding to each selected account statement;

displaying a second subset of the account statement cache within the print status tab when the user selects the print status tab, wherein the print status tab displays at least one of: an account number, a statement date, a statement generation date, a recipient name, and a statement type indicator corresponding to each of the individual account statements that have been released for printing;

receiving, from the user, a selection of the account statement from the quality review tab;

receiving, from the user, one of an approval of the account statement, a rejection of the account statement, a correction of the account statement, a request for regeneration of the account statement, and a request to delete the account statement;

removing the account statement from the quality review tab;

adding the account statement to the print status tab;

releasing the account statement for printing; and, removing the account statement from the print status tab.

2. The method of claim 1, further comprising:
enabling the batch printing only after all the individual account statements are approved and released for printing.

3. The method of claim 2, further comprising:
generating a report corresponding to the batch printing.

4. The method of claim 3, further comprising:
approving and releasing any of the individual account statements that are not selected for review.

5. The method of claim 4, further comprising:
receiving the correction to the account statement from the user, the correction including at least one of a change of a value appearing on the account statement and a change of a layout of the account statement.

6. The method of claim 5, further comprising:
receiving the change of the value appearing on the account statement, wherein the value is not changed in a financial database from which the individual account statements are generated; and
requiring a regeneration of the account statement in response to the change in the value.

7. The method of claim 6, further comprising:
receiving the change of the layout from the user, wherein the layout of the account statement is changed and regeneration of the account statement is not required.

8. The method of claim 7, further comprising:
receiving the approval of the account statement from the user;
receiving a release from the user for printing the account statement; and
printing all the individual account statements when there are no further individual account statements selected for review.

9. The method of claim 8, further comprising:
receiving the approval of the account statement from the user, wherein a release from the user for printing the account statement is not received; and
placing the approved account statement in the directory for review.

10. The method of claim 9, further comprising:
receiving an unapproval of the approved account statement from a second user; and
preventing the batch printing of all the individual account statements until an approval of the unapproved account statement is received.

11. The method of claim 10, further comprising:
receiving the request for regenerating the account statement;
receiving new data for the account statement from a financial database; and
regenerating the account statement using the new data, wherein remaining individual account statements are not regenerated due to regeneration of the account statement.

12. The method of claim 11, further comprising:
receiving the request to purge the account statement; and
removing only the purged account statement from the batch printing.

13. The method of claim 12, further comprising:
receiving a request from the user to print only the account statement on a local printer; and
locally printing the account statement without printing all the individual account statements.

14. The method of claim 13, further comprising:
generating a report corresponding to the batch printing of the individual account statements, the report comprising at least one of: a number of the individual account statements selected for quality review, a number of the individual account statements printed in the batch printing, a financial amount corresponding to changes made in the individual account statements, and a number of errors in the individual account statements.

15. The method of claim 14, said individual account statements comprising individual credit card account statements.

16. A computer-readable medium encoded with processing instructions for implementing a method, performed by a computer, the method comprising:
generating a directory of individual account statements designated for batch printing;
retrieving an account statement from the individual account statements;
releasing the account statement when the account statement is associated with a flag indicating that no action is required by a user;
automatically detecting when the account statement is erroneous, wherein the erroneous account statement includes at least one of erroneous data and missing data and, wherein the erroneous account statement is added to an account statement cache;

presenting the account statement cache to a user by way of a graphical user interface, wherein the graphical user interface includes a quality review tab and a print status tab;

receiving, from the user, a selection of at least one of: the quality review tab and the print status tab;

displaying a first subset of the account statement cache within the quality review tab when the user selects the quality review tab, wherein the quality review tab displays at least one of: an account number, a statement date, a statement generation date, a recipient name, and a statement type indicator corresponding to each selected account statement ;

displaying a second subset of the account statement cache within the print status tab when the user selects the print status tab, wherein the print status tab displays at least one of: an account number, a statement date, a statement generation date, a recipient name, and a statement type indicator corresponding to each of the individual account statements that have been released for printing;

receiving, from the user, a selection of the account statement from the quality review tab;

displaying the account statement selected by the user; and enabling the user to enter any of: an approval of the selected account statement, a rejection of the selected account statement, a correction of the selected account statement, a request for regeneration of the selected account statement, a request to purge the selected account statement, and a release of the selected account statement for printing;

removing the account statement from the quality review tab;

adding the account statement to the print status tab;

releasing the account statement for printing; and, removing the account statement from the print status tab.

* * * * *